United States Patent
Kawashima

(10) Patent No.: US 8,253,829 B2
(45) Date of Patent: Aug. 28, 2012

(54) IMAGE PROCESSING APPARATUS, IMAGING APPARATUS, AND IMAGE PROCESSING METHOD

(75) Inventor: Manabu Kawashima, Tokyo (JP)

(73) Assignee: Sony Corporation, Tokyo (JP)

( * ) Notice: Subject to any disclaimer, the term of this patent is extended or adjusted under 35 U.S.C. 154(b) by 280 days.

(21) Appl. No.: 12/783,984

(22) Filed: May 20, 2010

(65) Prior Publication Data

US 2010/0302416 A1  Dec. 2, 2010

(30) Foreign Application Priority Data

May 27, 2009  (JP) ................ P2009-128099

(51) Int. Cl.
*H04N 9/64* (2006.01)
*H04N 5/335* (2011.01)
*G06K 9/40* (2006.01)

(52) U.S. Cl. ............ 348/246; 348/273; 382/275
(58) Field of Classification Search .......... 348/246; 382/275

See application file for complete search history.

(56) References Cited

U.S. PATENT DOCUMENTS

| | | | | |
|---|---|---|---|---|
| 5,125,042 A * | 6/1992 | Kerr et al. | ........... | 382/300 |
| 5,552,825 A * | 9/1996 | Talluri et al. | ........... | 348/222.1 |
| 6,781,626 B1 * | 8/2004 | Wang | ........... | 348/273 |
| 7,015,961 B2 * | 3/2006 | Kakarala | ........... | 348/246 |
| 7,362,897 B2 * | 4/2008 | Ishiga | ........... | 382/167 |
| 8,004,588 B2 * | 8/2011 | Lukac | ........... | 348/252 |
| 8,089,536 B2 * | 1/2012 | Kotani | ........... | 348/246 |
| 2003/0011708 A1 * | 1/2003 | Kawamura et al. | ........... | 348/448 |
| 2004/0119856 A1 * | 6/2004 | Nishio et al. | ........... | 348/246 |
| 2005/0030395 A1 * | 2/2005 | Hattori | ........... | 348/246 |
| 2006/0132626 A1 * | 6/2006 | Sakurai | ........... | 348/246 |
| 2007/0024934 A1 * | 2/2007 | Andams et al. | ........... | 358/525 |
| 2008/0240559 A1 * | 10/2008 | Malvar | ........... | 382/167 |
| 2009/0096899 A1 * | 4/2009 | Quan | ........... | 348/273 |
| 2009/0160992 A1 * | 6/2009 | Inaba et al. | ........... | 348/308 |
| 2009/0244333 A1 * | 10/2009 | Lukac | ........... | 348/280 |
| 2010/0188555 A1 * | 7/2010 | Hirao et al. | ........... | 348/340 |
| 2011/0211099 A1 * | 9/2011 | Nayar et al. | ........... | 348/278 |

FOREIGN PATENT DOCUMENTS

JP  2003 242504  8/2003

* cited by examiner

*Primary Examiner* — Nhan T Tran
*Assistant Examiner* — Amy Hsu
(74) *Attorney, Agent, or Firm* — Frommer Lawrence & Haug LLP; William S. Frommer

(57) ABSTRACT

An image processing apparatus includes: a first interpolating portion calculating a first interpolation value for a pixel value of a pixel of interest using pixel values of the pixel of interest and pixels neighboring the pixel of interest; a second interpolating portion detecting the direction of a smallest jump amount to calculate a second interpolation value for the pixel value of the pixel of interest; a detecting portion determining whether any change is made by interpolation using the first interpolation value, and selecting the first or second interpolation value when there is change or not; and an isolated point detecting portion determining whether the pixel of interest is an isolated point, outputting the first or second interpolation value when the pixel of interest is an isolated point, and outputting the pixel value of the pixel of interest when the pixel of interest is not an isolated point.

7 Claims, 6 Drawing Sheets

EXAMPLE OF ISOLATED POINT INTERPOLATING PROCESS

| FIG.7B | FIG.7C | FIG.7D |
|---|---|---|
| /8 | /2 | /1 |
| STATIC INTERPOLATION | ADAPTIVE INTERPOLATION | MEDIAN INTERPOLATION |

EXAMPLES OF INTERPOLATION PROCESSES ACCORDING TO THE RELATED ART

IMAGE PROCESSING APPARATUS, IMAGING APPARATUS, AND IMAGE PROCESSING METHOD

BACKGROUND OF THE INVENTION

1. Field of the Invention

The present invention relates to an image processing apparatus, an imaging apparatus, and an image processing method. More particularly, the invention relates to a technique for adequately interpolating pixels which have been determined as isolated points.

2. Description of the Related Art

In the related art, an image signal obtained by an imaging apparatus may have fixed point noise generated by a defect of the imaging element, and the image signal may include an isolated point having a pixel level extremely higher than neighboring pixel levels (pixel values) which is generated under the influence of random noise such as photon shot noise or thermal noise. Under the circumstance, an isolated point interpolation process is carried out to perform real time detection of such an isolated point real time and to interpolate a proper pixel level (interpolation value).

Referring to methods used for isolated point interpolation processes, three types of methods, i.e., static interpolation, adaptive interpolation, and median interpolation are primarily used. FIGS. 7B to 7D are illustrations for explaining those methods. The methods shown in FIGS. 7B to 7D will be described on an assumption that an edge diagonally extends in the bottom-to-top and left-to-right direction to pass by a pixel of interest P as shown in 7A. A filter ranging three pixels in the horizontal direction and three pixels in the vertical direction is used. In FIGS. 7B to 7D, a filter coefficient is shown as a value "0" or "1".

In the case of static interpolation shown in FIG. 7B, the values of pixels whose filter coefficient is set at "1", i.e., the values of all eight pixels neighboring the pixel of interest P are totaled, and the total value thus obtained is divided by 8 which is the number of the pixel levels which have been totaled. An average value of the pixel levels of the eight neighboring obtained as thus described is used as an interpolated value at the pixel of interest P.

In the case of adaptive interpolation shown in FIG. 7C, the extending direction of the edge is first determined, and interpolation is carried out along the extending direction of the edge. Specifically, an average value of the pixel levels of the two pixels located inside and close to the edge (the pixel below and to the left of the pixel of interest P and the pixel above and to the right of the pixel P) is calculated, and the average value thus obtained is used as an interpolation value for the pixel of interest P.

In the case of median interpolation shown in FIG. 7D, the median of the nine pixels in the filter window is calculated, and the calculated median is used as an interpolation value. FIG. 7D shows a case which is based on an assumption that the adjacent pixel to the right of the pixel of interest P is the median, and a filter coefficient "1" is set in the position. That is, the pixel level in that position is output as the pixel level of the pixel of interest P.

An example of an interpolation process using a median filter is described in JP-A-2003-242504 (Patent Document 1).

SUMMARY OF THE INVENTION

Any of the above-described interpolation processes may disadvantageously result in problems at an edge of an image. For example, in the case of adaptive interpolation as shown in FIG. 7C, the determination of an edge direction itself may not be accurately performed when the image signal of interest has a poor signal-to-noise ratio. As a result, the interpolation process can result in problems such as a one pixel-wide gap formed in a character or the like.

In the case of median interpolation as shown in FIG. 7D, as described above, interpolation is carried out using the median of pixel levels included in a filter window. This approach has a problem in that an edge of an image can be distorted as a result of interpolation when the image signal has a poor signal-to-noise ratio, just as encountered in the case of adaptive interpolation.

In the case of static interpolation as shown in FIG. 7A, the determination of an edge direction is not carried out, and the method employs a filter which always applies a constant coefficient. Therefore, the interpolation process does not result in distortion of an edge. However, since pixel levels on both sides of an edge are summed up, a problem arises in that the frequency of the pixel levels at the edge region becomes undesirably low.

Under the circumstance, it is desirable to keep the frequency of pixel levels at an edge region appropriately even when the image signal of interest has poor signal-to-noise ratio to allow proper interpolation at an isolated point.

According to an embodiment of the invention, a first interpolation value for the pixel value of a pixel of interest is first calculated using the pixel values of a plurality of pixels neighboring the pixel of interest. The direction of a smallest jump amount is detected from among directions defined by the pixel of interest and the plurality of neighboring pixels, the direction of a smallest jump amount being the direction in which a smallest sum of differences from the pixel values of the pixel of interest exists. Then, a second interpolation value for the pixel value of the pixel of interest is calculated using the pixel values of pixels located in the direction of the smallest jump amount and the pixel value of the pixel of interest. Then, using the pixel values of the pixels located in the direction of the smallest jump amount, the first interpolation value and the second interpolation value, it is determined whether any change is made by interpolation performed using the first interpolation value in the relationship between the magnitudes of the pixel values of the pixel of interest and the pixels located in the direction of the smallest jump amount. The first interpolation value is selected when there is no change, and the second interpolation value is selected when there is a change. Further, it is determined whether the pixel of interest is an isolated point. The first interpolation value or the second interpolation value thus selected is output when it is determined that the pixel of interest is an isolated point, and the pixel value of the pixel of interest is output when it is determined that the pixel of interest is not an isolated point.

Thus, when the interpolation carried out using the first interpolation value results in a change in the relationship between the magnitudes of the pixel values of the pixel of interest and the pixels located in the direction of the smallest jump amount, an interpolation value calculated using the pixel values of the pixel of interest and the pixels located in the direction of the smallest jump amount is used.

When an edge exists in the region of a filter and interpolation carried out using the first interpolation value can result in a change in the relationship between the magnitudes of the pixel values of the pixel of interest and the pixels located in the direction of the smallest jump amount, an interpolation value is calculated using the pixel values of pixels having high correlation with the pixel of interest. That is, when it is determined that an isolated point interpolating process can result in a problem, the interpolation can be performed at a pixel of interest (isolated point) using an interpolation value which will not cause a problem.

According to the embodiment of the invention, when it is determined that an isolated point interpolating process can result in a problem, the interpolation can be performed at an isolated point using an interpolation value by which no problem can be caused. Therefore, even in the case of an image signal having a poor signal-to-noise-ratio, the frequency of a pixel at an edge region will not become unnecessarily low. That is, interpolation can be properly carried out at an isolated point.

BRIEF DESCRIPTION OF THE DRAWINGS

FIGS. 7A to 7D are illustrations showing examples of interpolation processes according to the related art, FIG. 7B showing an example of static interpolation, FIG. 7C showing an example of adaptive interpolation, FIG. 7D showing an example of median interpolation.

DESCRIPTION OF PREFERRED
EMBODIMENTS

Specific examples of an image processing apparatus, an imaging apparatus, and an image processing method according to an embodiment of the invention will now be described with reference to the drawings. The invention is not limited to the embodiment described below. The following topics will be described in the order listed.

1. Exemplary Configuration of Image Processing Apparatus

2. Exemplary Configuration of Isolated Point Eliminating Section

3. Steps of Image Processing

<1. Exemplary Configuration of Image Processing Apparatus>

The present embodiment (which may be also referred to as "example") is an example of application of an image processing apparatus according to the invention to an imaging apparatus such as a camera. The image processing apparatus according to the embodiment of the invention is not limited to applications to imaging apparatus, and the invention may be applied to any type of apparatus and systems having an image processing function, e.g., rendering apparatus such as displays and printers and apparatus including image processing applications. Possible applications of the invention to imaging apparatus include not only cameras themselves but also information processing apparatus having an imaging function (e.g., mobile telephones).

[Configuration of Imaging Apparatus]

Figure 1:
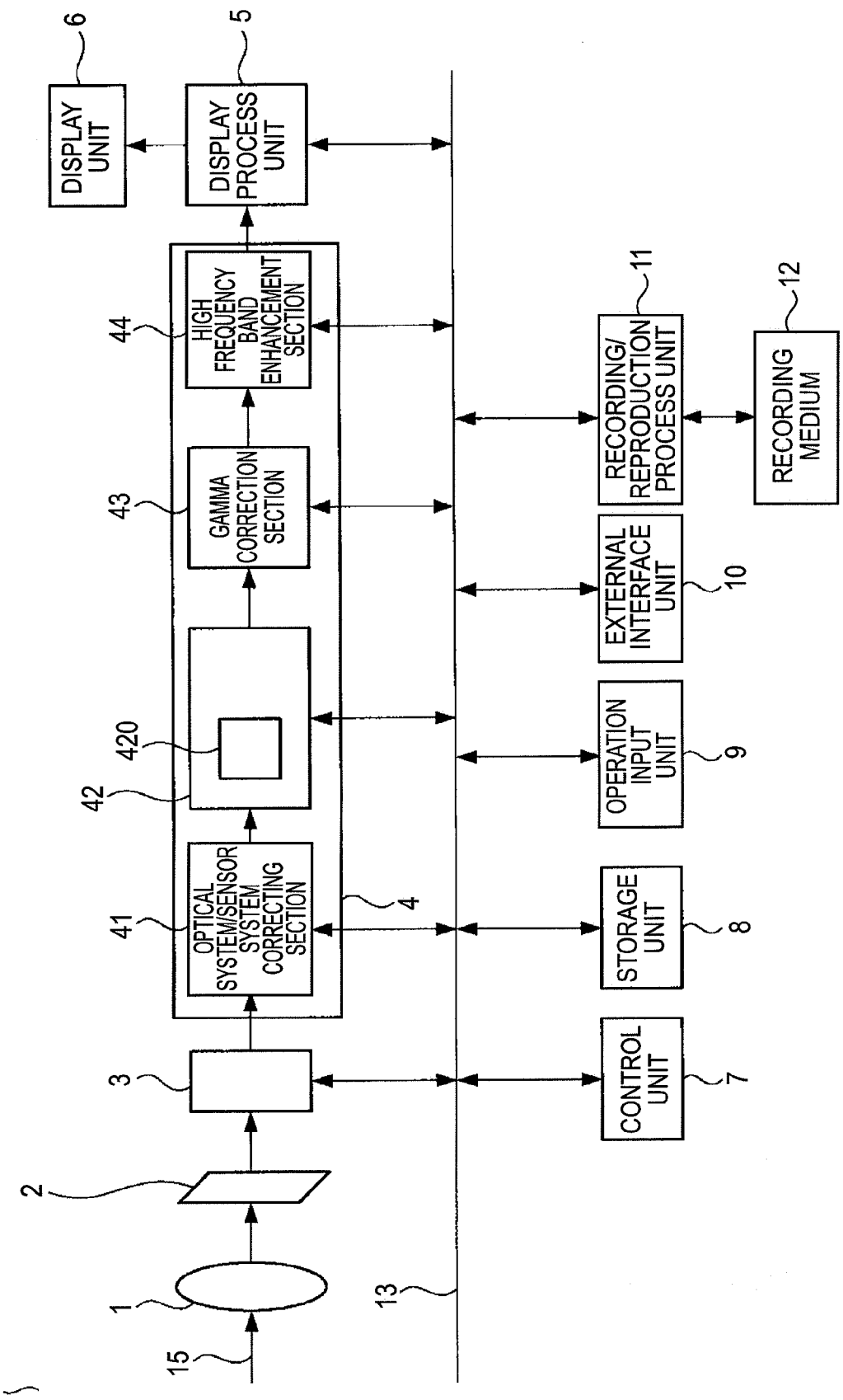
FIG. 1 is a block diagram showing an exemplary internal configuration of an imaging apparatus according to an embodiment of the invention.

FIG. 1 schematically shows a configuration of blocks of an imaging apparatus according to the present embodiment. An imaging apparatus 100 includes a lens 1, an imaging element 2, an analog-to-digital converter (ADC) 3, and an image processing unit 4. The lens 1, the imaging element 2, the ADC 3, and the image processing unit 4 are disposed in the order listed from the side of the apparatus where object light 15 enters.

The imaging apparatus 100 also includes a display process unit 5, a display unit 6, a control unit 7, a storage unit 8, an operation input unit 9, an external interface unit 10, a recording/reproduction process unit 11, and a recording medium 12. The above-described parts of the imaging apparatus 100 are electrically connected to each other through a signal line 13 in a direct or indirect manner.

The lens 1 collects object light to form an image on an imaging surface (not shown) of the imaging element 2. The imaging element 2 generates an image signal by performing photoelectric conversion of the object light which has been formed into an image by the lens 1. The imaging element 2 outputs the image signal thus generated to the ADC 3. For example, various types of image sensors such as CCD (charge coupled device) type sensors and CMOS (complementary metal oxide semiconductor) type sensors may be used as the imaging element 2.

Although FIG. 1 shows only one imaging element 2, three imaging elements associated with three colors, i.e., red (R), green (G), and blue (B) are provided in practice. Therefore, a color separation prism for separating incident light into the three colors R, G, and B is disposed between the group of imaging elements, i.e., the three imaging elements 2 and the lens 1, although not shown.

The ADC 3 converts the image signal output from the imaging element 2 into a digital imaging signal and outputs the digital-converted imaging signal to the image processing unit 4. When a CMOS type image sensor is used as the imaging element 2, the ADC 3 is not required because the analog-to-digital conversion process on the image signal is also performed in the imaging element 2.

The image processing unit 4 performs various processes on the image signal output from the ADC 3 and outputs a processed image signal to a noise reduction process section 42. The image processing unit 4 includes an optical system/sensor system correcting section 41, the noise reduction process section 42, a gamma correction section 43, and a high frequency band enhancement process section 44.

The optical system/sensor system correcting section 41 performs processes for correcting distortion of the image signal attributable to the lens 1 (optical system correcting processes) and processes for correcting distortion of the image signal attributable to the imaging element 2 (sensor system correcting processes). For example, the optical system correcting processes include distortion correction, aberration correction, correction of peripheral shading, and flare correction. The sensor system correction processes include, for example, correction of pixel defects and correction of shading. When a CMOS type image sensor is used as the imaging element 2, the sensor system correction process further include vertical fringe correction. When a CCD type image sensor is used as the imaging element 2, the sensor system correction processes also include smear correction.

The noise reduction process section 42 performs a noise suppression process on the image signal output from the optical system/sensor system correcting section 41 and supplies a resultant noise-eliminated signal to the gamma correction section 43. In the present embodiment, the noise reduction process section 42 includes an isolated point eliminating portion 420 for eliminating an isolated point. Details of the isolated point eliminating portion 420 will be described later.

The gamma correction section 43 corrects a gamma value of the image signal output from the noise reduction process section 42 such that it will be compatible with gamma characteristics of the display unit 6. The high frequency band enhancement section 44 performs correction for enhancing high frequency components associated with edge regions (contour) of an image obtained from the gamma-corrected image signal.

The present embodiment is described as an example in which the noise reduction process section 42 is disposed upstream of the gamma correction section 43 or an example in which the noise reduction process section 42 is disposed in an area where the image signal has linear characteristics. However, the invention is not limited to such disposition. The noise reduction process section 42 may be disposed downstream of the gamma correction section 43. That is, the noise reduction process section 42 may be disposed in an area where the image signal has non-linear characteristics. When the noise reduction process section 42 is disposed downstream of the gamma correction section 43, the section 42 is preferably disposed upstream of the high frequency band enhancement section 44. The reason is that the noise elimination process of the noise reduction process section 42 will not provide a sufficient noise reduction effect when it is performed on an image signal which has been processed by the high frequency band enhancement section 44 to enhance high frequency components associated with edge regions of the image.

The display process unit 5 converts the image signal which has been subjected to various processes at the image processing unit 4 into a signal in a form which can be displayed by the display unit 6, and the unit 5 outputs the converted signal to the display unit 6. For example, the display unit 6 may be an LCD (liquid crystal display) or an organic EL (electro luminescence) panel, and the signal supplied from the display process unit 5 is displayed as an image on a display screen.

The control unit 7 may be constituted by a CPU (central processing unit), and it controls various parts forming the imaging apparatus 100 based on operation signals supplied from the operation input unit 9 which will be described later. The storage unit 8 may be constituted by a ROM (read only memory) and/or a RAM (random access memory). Programs and various types of data required for image processing are stored in the ROM, and the RAM is used as a work area for temporarily storing interim results of various processes carried out by the control unit 7.

The operation input unit 9 includes operating means such as buttons, knobs, and switches. The operation input unit 9 accepts predetermined operations input from a user through the operating means, generates operation signal according to the content of the operations, and outputs the operation signals thus generated to the control unit 7.

The external interface unit 10 includes input/output terminals (not shown) which can be connected to an external apparatus, and data are input and output from and to the external apparatus through the input/output terminals.

The recording/reproduction process unit 11 is connected to the recording medium 12 which will be described later. The unit performs a process of recording an image signal output from the image processing unit 4 in the recording medium 12, a process of reading and reproducing image data recorded in the recording medium 12, and a process of outputting a resultant reproduction signal to the display process unit 5.

For example, the recording medium 12 may be a HDD (hard disk drive), a semiconductor memory, or an optical disk. The recording medium 12 is provided to store signals such as image signals which have been processed by the image processing unit 4 and image signals recorded by an external recording apparatus.

<2. Exemplary Configuration of Isolated Point Eliminating Portion>

[Internal Configuration of Isolated Point Elimination Portion]

Figure 2:
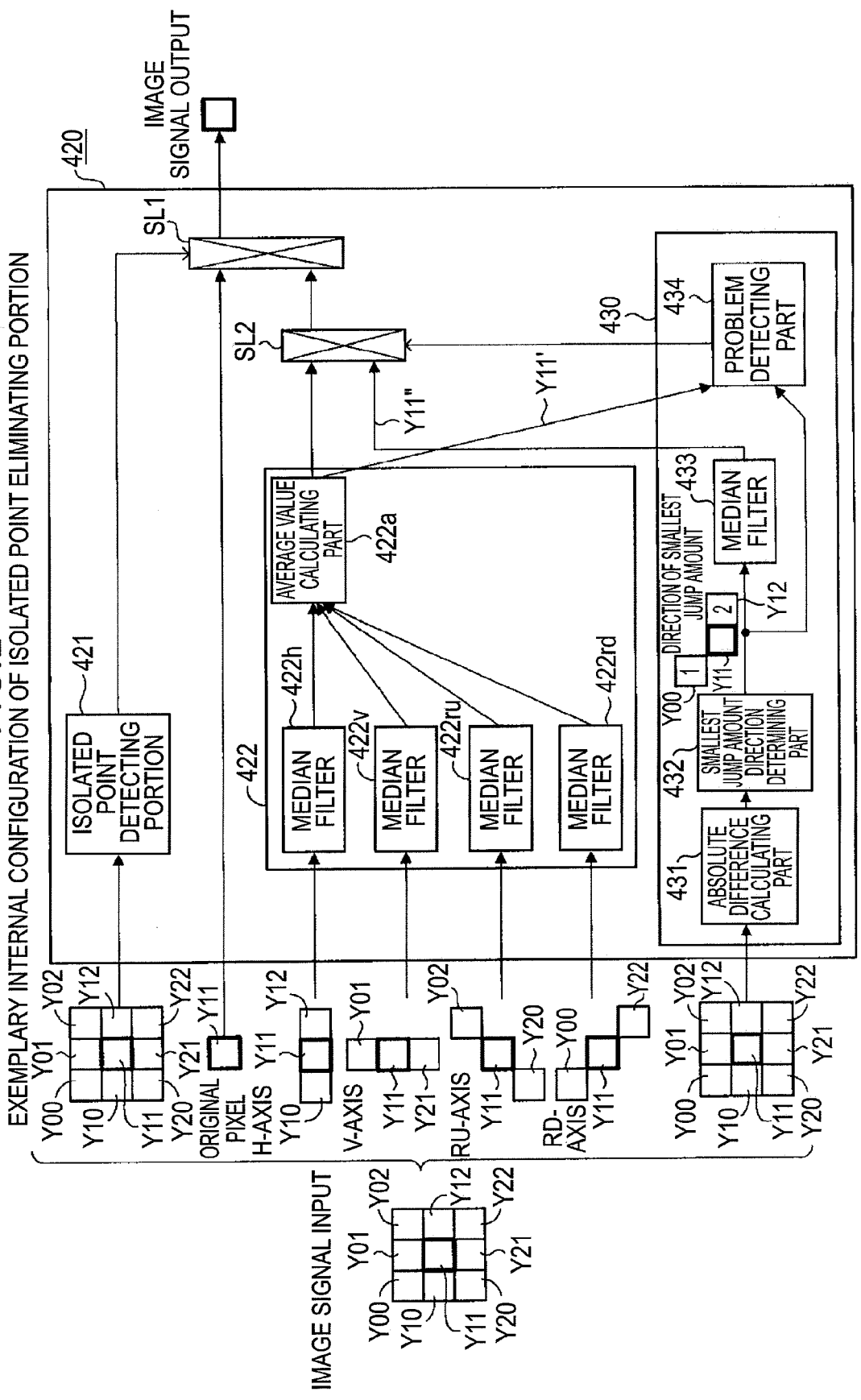
FIG. 2 is a block diagram showing an exemplary internal configuration of an isolated point eliminating portion according to the embodiment of the invention.

Details of the isolated point eliminating portion 420 will now be described with reference to FIG. 2. FIG. 2 is a block diagram showing an exemplary internal configuration of the isolated point eliminating portion 420. The isolated point eliminating portion 420 includes an isolated point detecting portion 421 for detecting an isolated point, an isolated point interpolating portion 422 serving as a first interpolating portion for performing an interpolation process at an isolated point, and a problem elimination process portion 430 serving as a second interpolating portion for eliminating problems which can be caused by an isolated point interpolating process.

The isolated point eliminating portion 420 also includes a selector SL1 and a selector SL2. The selector SL1 selects and outputs either an image signal which has been subjected to the interpolation process at the isolated point interpolating portion 422 or an image signal which has been subjected to no process (original pixel) depending on the result of detection performed by the isolated point detecting portion 421. The selector SL2 selects either an output signal from the isolated point interpolating portion 422 or an output signal from the problem elimination process portion 430 and outputs the selected signal to the selector SL1.

The isolated point detecting portion 421 determines whether a pixel of interest is an isolated point or not from pixel levels input thereto, i.e., a pixel level Y11 of the pixel of interest and pixel levels Y00 to Y22 of eight respective pixels neighboring the pixel of interest within in a window having a horizontal range equivalent to three pixels and a vertical range equivalent to three pixels.

The isolated point detecting portion 421 first calculates a difference between the pixel level Y11 of the pixel of interest and the pixel level of each of the pixels neighboring the pixel of interest. Next, the portion 421 counts the number of differences greater than a preset threshold imp_th, among the calculated differences, and the portion determines whether the number of differences is equal to or greater than a preset threshold imp_refcnt. When the number of differences having values greater than the preset threshold imp_is equal to or greater than the threshold imp_refcnt, it is determined that the pixel of interest is an isolated point. Then, the portion 421 supplies a switching signal to the selector S1 to cause it to select the output signal from the selector S2.

The threshold imp_th is set at a value greater than "0". For example, when a digital pixel signal generated by the ADC 3 (see FIG. 1) has eight bits, the threshold is set at a value within the range from about 10 to about 20. The threshold is set at an appropriate value depending on the resolution of the ADC 3, the amount of noise included in the image signal, and the magnitudes of differences between the levels of adjoining pixels (whether the region to be process is a gradated region having gentle transitions between pixel levels).

The threshold imp_refcnt is set at a value equal to or smaller than "8" which is the number of pixels neighboring the pixel of interest. In this example, it is assumed that the threshold imp_refcnt is set at "8".

Specifically, the above-mentioned determination is made, for example, using algorithm as described below.

(1) The value of a positive neighboring difference flag Fdp_ij (i,j=0, 1, 2) is determined as follows.

The positive neighboring difference flag Fdp_ij=1 when the pixel level Y11 of the pixel of interest−the pixel level Yij of a neighboring pixel>threshold imp_th.

The positive neighboring difference flag Fdp_ij=0 if else.

That is, it is determined whether the difference between the pixel level Y11 of the pixel of interest and the pixel level Yij of the neighboring pixel is greater than the threshold imp_th in the positive direction. If yes, the positive neighboring difference flag Fdp_ij has a value 1. Otherwise (when the difference is equal to or smaller than the threshold imp_th), the positive neighboring difference flag Fdp_ij has a value "0".

(2) The value of a negative neighboring difference flag Fdm_ij is determined as follows.

The negative neighboring difference flag Fdm_ij=1 when the pixel level Y11 of the pixel of interest—the pixel level Yij of a neighboring pixel<-threshold imp_th The negative neighboring difference flag Fdm_ij=0 if else.

That is, it is determined whether the difference between the pixel level Y11 of the pixel of interest and the pixel level Yij of the neighboring pixel is greater than the threshold imp_th in the negative direction. If yes, the negative neighboring difference flag Fdm_ij has a value 1. Otherwise (when the difference is equal to or smaller than the threshold imp_th), the negative neighboring difference flag Fdm_ij has a value "0".

(3) A positive isolated point detection flag Fap is determined as follows.

The positive isolated point detection flag Fap=1 when Σ(positive neighboring difference flag Fdp_ij)≧threshold imp_refcnt.

The positive isolated point detection flag Fap=0, if else.

That is, when the total number of positive neighboring difference flags Fdp_ij is equal to or greater than the present number "8" set as the threshold imp_refcnt, the positive isolated point detection flag Fap has a value "1". Otherwise, the flag has a value "0".

(4) A negative isolated point detection flag Fam is determined as follows.

The negative isolated point detection flag Fam=1 when Σ(negative neighboring difference flag Fdm_ij)≧threshold imp_refcnt.

The negative isolated point detection flag Fam=0, if else.

That is, when the total number of negative neighboring difference flags Fdm_ij is equal to or greater than the present number "8" set as the threshold imp_refcnt, the negative isolated point detection flag Fam has a value "1". Otherwise, the flag has a value "0".

The calculations of the positive neighboring difference flags Fdp_ij and the negative neighboring difference flags Fdm_ij may be carried out in reverse order, and the calculations may alternatively be carried out at the same time. This equally applies to the calculations of the positive isolated point detection flag Fap and the negative isolated point detection flag Fam.

A configuration of the isolated point interpolating portion 422 will now be described. The isolated point interpolating portion 422 includes median filters 422h, 422v, 422ru, and 422rd and an average value calculating part 422a.

The median filters 422h, 422v, 422ru, and 422rd calculate the median of the pixel levels of three pixels into to the same and output the result of calculation to the average value calculating part 422a. The filters used have three taps on a one-dimensional axis. Four one-dimensional axes, i.e., an H-axis (horizontal axis), a V-axis (vertical axis), an RU-axis (right-up axis), and an RD-axis (right-down axis) are used.

The pixel level Y11 of the pixel of interest and the pixel levels of the two pixels adjoining the pixel of interest in the horizontal direction (pixel levels Y10 and Y12) are input to the median filter 422h. The pixel level Y11 of the pixel of interest and the pixel levels of the two pixels adjoining the pixel of interest in the vertical direction (pixel levels YO1 and Y21) are input to the median filter 422v.

The pixel level Y11 of the pixel of interest and the pixel levels of the two diagonally adjoining pixels located above and below the pixel of interest on the right side of the same (pixel levels Y02 and Y20) are input to the median filter 422ru. Further, the pixel level Y11 of the pixel of interest and the pixel levels of the two diagonally adjoining pixels located above and below the pixel of interest on the left side of the same (pixel levels Y00 and Y22) are input to the median filter 422rd.

Figure 3:
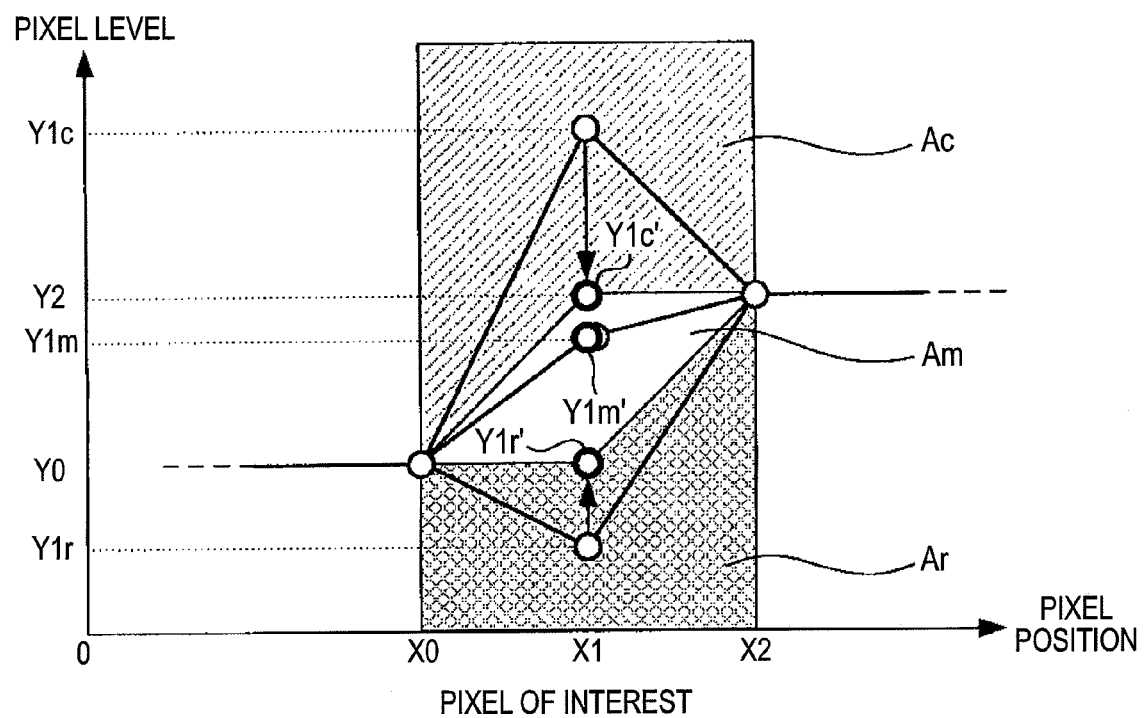
FIG. 3 is a graph showing an example of a process carried out by median filters according to the embodiment of the invention.

Examples of processes performed by the median filters will now be described with reference to FIG. 3. In FIG. 3, pixel positions are shown along the horizontal axis, and the levels of pixel levels Y are shown along the vertical axis. FIG. 3 shows three pixels, i.e., pixels X0, X1, and X2 located on each one-dimensional axis, and the pixels are shown as having pixel levels Y0, Y1, and Y2, respectively.

When the pixel level Y2 is higher than the pixel level Y0 as shown in FIG. 3, the pixel level Y1 resides in any of a high value area Ac, a monotonous increase area Am, and a low value area Ar as shown in FIG. 3. In FIG. 3, the high value area Ac is indicated by oblique lines; the low value area Ar is indicated by meshing; and the monotonous increase area Am is shown as an area without shading.

The high value area Ac is an area where pixel levels higher than the pixel level Y2 reside, and the monotonous increase area Am is an area where pixel levels between the pixel levels Y0 and Y2, inclusive, reside. The low value area Ar is an area where pixel level lower than the pixel level Y0 reside.

Let us assume that the pixel level Y1 of the pixel of interest X1 is classified as residing in the high value area Ac and that the pixel level Y1 has a value "Y1c" (a pixel level Y1c). Then, the median of the pixel levels Y0, Y1c, and Y2 is a pixel level Y1c' which has the same value as the pixel level Y2.

Similarly, let us assume that the pixel level Y1 of the pixel of interest X1 is classified as residing in the monotonous increase area Am and that the pixel level Y1 has a value "Y1m" (a pixel level Y1m). Then, a pixel level Y1m' which has the same value as the pixel level Y1m is output as the median of the pixel levels Y0, Y1r and Y2. Although the pixel levels Y1m and Y1m' are shown in pixel positions offset from each other on the horizontal axis of FIG. 3 for easier understanding of the description, those pixel levels should be shown in the same position on the horizontal axis in practice.

Let us assume that the pixel level Y1 of the pixel of interest X1 is classified as residing in the low value area Ar and that the pixel level Y1 has a value "Y1r" (a pixel level Y1r). Then, the median of the pixel levels Y0, Y1r, and Y2 is a pixel level Y1r' which has the same value as the pixel level Y0.

That is, the use of the median filters allows an edge region (high frequency components) of the image signal to be maintained while eliminating significantly irregular components. Although FIG. 3 shows a case in which the pixel level Y2 is higher than the pixel level Y0 by way of example, medians are similarly calculated also when the pixel level Y0 is higher than the pixel level Y2.

Referring to FIG. 2 again, the average value calculating part 422a calculates an average value of medians output from the median filters 422h, 422v, 422ru, and 422rd and supplies the average value to the selector SL2 and the problem eliminating process portion 430 as an interpolation value for the pixel of interest.

The processes at the median filters and the average value calculating part 422a shown in FIG. 2 can be represented by the following expressions.

(Process at Median Filter 422h)
  median med_h=median (pixel level Y10, pixel level Y11, pixel level Y12)
(Process at Median Filter 422v)
  median med_v=median (pixel level Y01, pixel level Y11, pixel level Y21)
(Process at Median Filter 422ru)
  median med_ru=median (pixel level Y20, pixel level Y11, pixel level Y02)
(Process at Median Filter 422rd) median med_rd=median (pixel level Y00, pixel level Y11, pixel level Y22)
(Process at Average Value Calculating Part 422a)
  Interpolation value Y11'=(median med_h+median med_v+median med_ru+median med_rd)/4

As a result of such processes performed at the median filters 422h, 422v, 422ru, and 422rd and the average value calculating part 422a, the value of the pixel level Y11 of the pixel of interest is more significantly suppressed, the higher the degree of isolation of the pixel level, i.e., the higher or lower the pixel level from the pixel levels of the neighboring pixels. That is, the pixel level Y11 of the pixel of interest is replace the pixel level with the interpolation value Y11' whose level is suppressed to (first interpolation value).

Details of the problem eliminating process portion 430 will now be described. The problem eliminating process portion 430 performs a process of eliminating problems which occur as a result of the execution of the interpolation process by the isolated point interpolating portion 422.

For example, a problem occurs when an original image includes a vertical straight line having a width equivalent to one pixel. In this case, the line is detected as having a monotonously increasing level on the V-axis, although it seems like an isolated point which is to be classified as residing in the high value area Ac (see FIG. 3) on the H-axis. Since the line seems like an isolated point to be classified as residing in the high value area Ac on the RU- and RD-axes, interpolation using an average of medians obtained on the four axes results in such an effect that a gap will be formed in the vertical straight line.

Under the circumstance, when it is determined that a problem as thus described can occur as a result of the interpolation process performed by the isolated point interpolating portion 422, the problem elimination process portion 430 outputs such an interpolation value that the problem will not occur. An interpolation value preventing the occurrence of a problem is an interpolation value calculated using pixels located in such a direction that a smallest difference from the pixel level Y11 of the pixel of interest exists.

When interpolation is carried out to replace the pixel level Y11 of the pixel of interest using such an interpolation value, the value of the pixel level Y11 will not be far away from the values of the pixel levels of the neighboring pixels whose values are close to the pixel value Y11. That is, even when an original image includes a vertical straight line having a width equivalent to one pixel, no gap will be formed in the line as a result of interpolation.

A configuration of the problem elimination process portion 430 will now be described with reference to FIG. 2. The problem elimination process portion 430 includes an absolute difference calculating part 431, a smallest jump amount direction determining part 432, a median filter 433, and a problem detecting part 434.

The absolute difference calculating part 431 calculates absolute values of differences between the pixel levels Y11 of the pixel of interest and the pixel levels of the eight pixels neighboring the same.

The smallest jump amount direction determining part 432 arranges the absolute differences calculated by the absolute difference calculating part 431 in the ascending order of their magnitudes to determine the direction in which a smallest amount of jump from the pixel level Y11 of the pixel of interest takes place. The amount of a jump is represented by the sum of the absolute values of differences from the pixel level Y11. Specifically, the jump amount in this example is represented by the sum of the absolute difference between the pixel having the smallest absolute difference with the pixel level Y11 and the pixel level Y11 and the absolute difference between the pixel having the second smallest absolute difference with the pixel level Y11 and the pixel level Y11 (sum of absolute differences).

In the example shown in FIG. 2, the smallest amount of jump takes in the direction defined by the pixel with the pixel level Y00 which has the smallest absolute difference from the pixel level Y11 and the pixel with the pixel level Y12 which has the second smallest absolute difference from the pixel level Y11.

Figure 4:
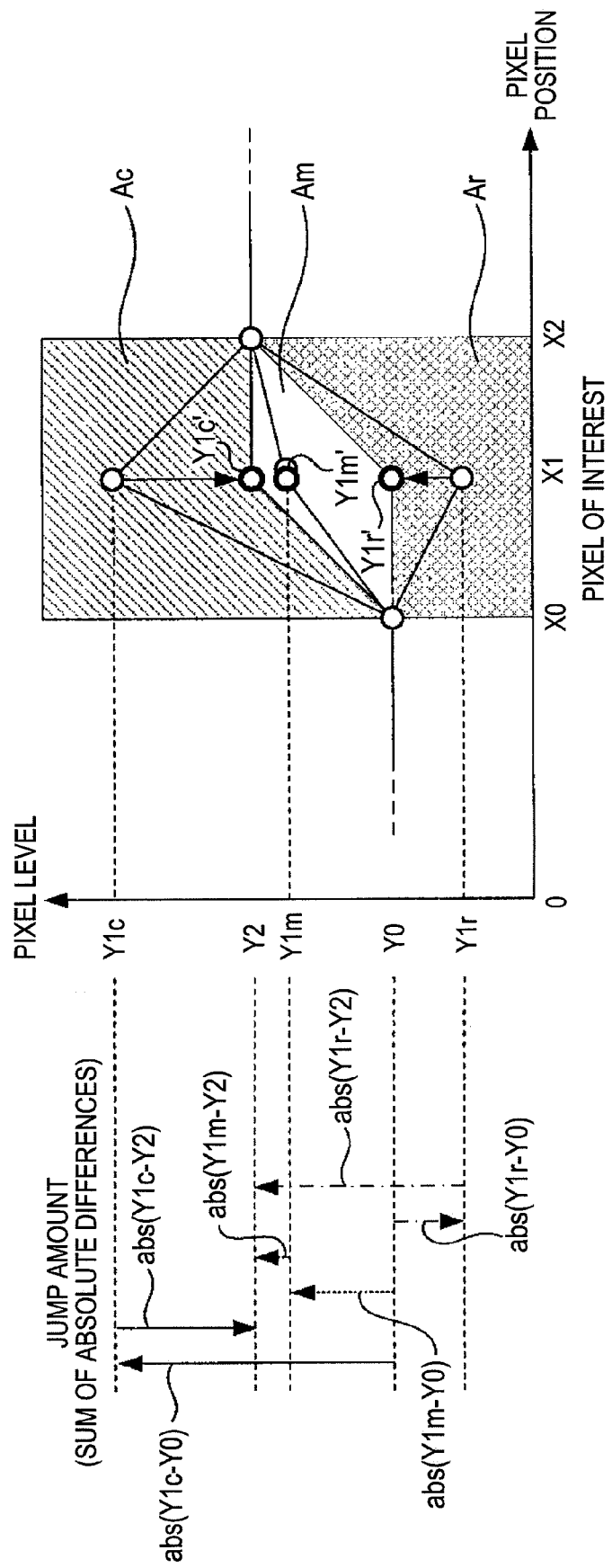
FIG. 4 is a diagram showing an example of the calculation of a jump amount according to the embodiment of the invention.

FIG. 4 illustrates the concept of a jump amount using the graph shown in FIG. 3 as an example. Items shown in FIGS. 3 and 4 in common are indicated by the same references. In FIG. 4, the pixels with the pixel levels having the smallest and second smallest absolute differences from the pixel level Y11 are the pixel X0 and the pixel X2, respectively (or the pixel X2 and the pixel X0, respectively).

When the pixel level of the pixel of interest X1 resides in the high value area Ac (when the pixel has a pixel level Y1c), the jump amount is given as the total of the amounts indicated by the two arrows shown in solid lines or given by the following expression.

sum of absolute differences=abs(pixel level $Y1c$-pixel level $Y0$)+abs(pixel level $Y1c$-pixel level $Y2$)

When the pixel level of the pixel of interest X1 resides in the monotonous increase area Am (when the pixel has a pixel level Y1m), the jump amount is given as the total of the amounts indicated by the two arrows shown in broken lines or given by the following expression.

sum of absolute differences=abs(pixel level $Y1m$-pixel level $Y0$)+abs(pixel level $Y1m$-pixel level $Y2$)

When the pixel level of the pixel of interest X1 resides in the low value area Ar (when the pixel has a pixel level Y1r), the jump amount is given as the total of the amounts indicated by the two arrows shown in chain lines or given by the following expression.

sum of absolute differences=abs(pixel level $Y1r$-pixel level $Y0$)+abs(pixel level $Y1r$-pixel level $Y2$)

Referring to FIG. 2 again, the smallest jump amount direction determining part 432 outputs the pixel level Y11 of the pixel of interest, the pixel level of the pixel having the smallest absolute difference from the pixel level Y11, and the pixel level of the pixel having the second smallest absolute difference from the pixel level Y11 to the median filter 433 and the problem detecting part 434.

The median filter 433 calculates the median of the three pixel levels, i.e., pixel level Y11 of the pixel of interest, the pixel level of the pixel having the smallest absolute difference from the pixel level Y11, and the pixel level of the pixel having the second smallest absolute difference from the pixel level Y11. The median thus calculated to the selector SL2 as an interpolation value".

The interpolation value Y11" calculated by the median filter 433 can be expressed as follows where the pixel level having the smallest absolute difference from the pixel level Y11 and the pixel level having the second smallest absolute difference from the pixel level Y11 are represented by Y1stmin and Y2ndmin, respectively.

interpolation value Y11" (second interpolation value)=median (pixel level Y1stmin, pixel level Y11, pixel level Y2ndmin)

The problem detecting part 434 determines whether any problem occurs as a result of the interpolation process using the pixel level Y1stmin, the pixel level Y11, and the pixel level Y2ndmin output from the smallest jump amount direction determining part 432 and the interpolation value Y11' output from the isolated point interpolating portion 422.

Specifically, it is determined that a problem occurs when the interpolation process performed by the isolated point interpolating portion 422 results in a change in the relationship between the magnitudes of the value of the pixel level Y11 of the pixel of interest and the value of the pixel level Y1stmin or the pixel level Y2ndmin.

First, the problem detecting part 434 carries out comparison between states before and after the interpolation as shown below.

The state before interpolation is specifically the pixel level Y1stmin, the pixel level Y11 of the pixel of interest, and the pixel level Y2ndmin The state after interpolation is specifically the pixel level Y1stmin, the interpolation value Y11' for the pixel of interest, the pixel level Y2ndmin It is determined that a problem can occur as a result of the interpolation process when there is any of the following differences between the area in which the pixel level Y11 of the pixel of interest is classified to reside before the interpolation and the area in which the interpolation value Y11' of the pixel of interest is classified to reside after the interpolation. Specifically, the differences are as follows (see FIG. 3 for both areas).

(1) The pixel level Y11 resides in the high value area Ac and the interpolation value Y11' resides in the low value area Ar.

(2) The pixel level Y11 resides in the low value area Ar and the interpolation value Y11' resides in the high value area Ac.

(3) The pixel level Y11 resides in the monotonous increase area Am and the interpolation value Y11' resides in the high value area Ac or the low value area Ar.

When it is determined that a problem can occur as a result of the interpolation process, the problem detecting part 434 supplies a switching signal to the selector SL2 to cause switching such that a signal will be input from the problem elimination process part 430 to the selector. As a result, the interpolation value Y11" output from the median filter 433 of the problem elimination process part 430 is output from the selector SL2 to the selector SL1.

When it is determined that no problem will occur as a result of the interpolation process, the problem detecting part 434 supplies a switching signal to the selector SL2 to cause switching such that a signal will be input from the isolated point interpolating portion 422 to the selector. As a result, the interpolation value Y11' output from the average value calculating part 422a of the isolated point interpolating portion 422 is output from the selector SL2 to the selector SL1.

<3. Steps of Image Processing>
[Example of Operations of Isolated Point Eliminating Portion]

Figure 5:
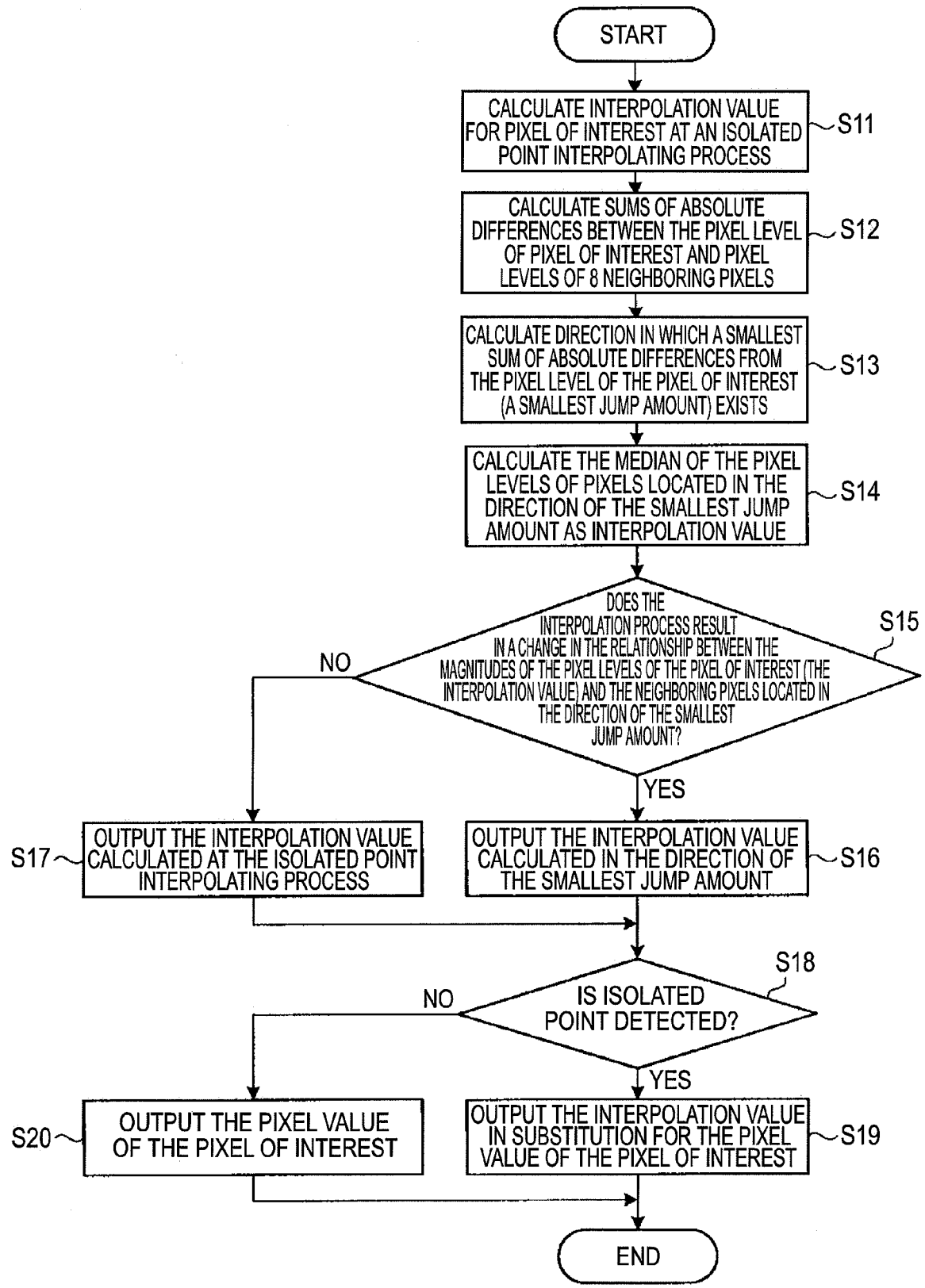
FIG. 5 is a flow chart showing an example of image processing according to the embodiment of the invention.

An example of operations of the isolated point eliminating portion 420 will now be described with reference to the flow chart shown in FIG. 5. First, the isolated point interpolating portion 422 performs an isolated point interpolating process to calculate an interpolation value Y11' for a pixel of interest (step S11). Next, the absolute difference calculating part 431 of the problem elimination process portion 430 calculates absolute differences between the pixel level Y11 of the pixel of interest and the pixel levels of eight pixels neighboring the pixel of interest (step S12). The smallest jump amount direction determining part 432 of the problem elimination process portion 430 determines the direction in which a sum of absolute differences (a smallest jump amount) with the pixel level Y11 of the pixel of interest becomes the smallest (step S13).

Next, the median filter 433 of the problem elimination process portion 430 calculates the median of the pixel level Y11 of the pixel of interest and the pixel levels of the pixels located in the direction in which the smallest jump amount from the pixel level Y11 exists and adopts the median as an interpolation value Y11" (step S14).

Next, the problem detecting part 434 determines whether the interpolation process performed by the isolated point interpolating portion 422 results in any change in the relationship between the magnitudes of the pixel level Y11 of the pixel of interest and the pixel levels of the pixels located in the direction in which the smallest jump amount from the pixel level Y11 exists (step S15). Specifically, it is determined whether there is any difference between the area where the pixel level Y11 of the pixel of interest is classified to resides before the interpolation process and the area where the interpolation value Y11' obtained by the interpolation process is classified to reside. When the pixel level 11 which has been in the high value area Ac or the low value area Ar is changed into an interpolation value Y11' in the monotonous increase area Am, the change is not regarded as such an area change.

Specifically, the answer at step S15 is "yes", and the process proceeds to step S16 in the following cases.

(1) The pixel level Y11 is classified to reside in the high value area Ac, and the interpolation value Y11' is classified to reside in the low value area Ar.

(2) The pixel level Y11 is classified to reside in the low value area Ar, and the interpolation value Y11' is classified to reside in the high value area Ac.

(3) The pixel level Y11 is classified to reside in the monotonous increase area Am, and the interpolation value Y11' is classified to reside in the high value area Ac or the low value area Ar. At step S16, an interpolation value Y11", in the direction in which a smallest jump amount exists, calculated by the problem elimination process portion 430 is selected and output as an interpolation value for the pixel of interest.

When the interpolation value Y11' is classified to reside in the area where the pixel level Y11 has resides (including the case in which the interpolation value Y11' is in the monotonous increase area Am whereas the pixel level Y11 has resided in the high value area Ac or the low value area Ar), the answer at step S15 is "No", and the process proceeds to step S17. At step S17, the interpolation value Y11' calculated by the isolated point interpolating portion 422 is selected and output as an interpolation value for the pixel of interest.

Next, the isolated point detecting portion 421 determines whether an isolated point has been detected or not (step S18). When an isolated point has been detected, the interpolation value Y11' or the interpolation value Y11" is substituted for the pixel level Y11 of the pixel of interest, and the interpolation value is output (step S19). When no isolated point is detected, the pixel level Y11 of the pixel of interest is output as it is (step S20).

[Advantages of the Embodiment]

In the above-described embodiment, when it is determined that an isolated point interpolating process results in a change in the relationship between the magnitudes of the pixel values of a pixel of interest and pixels located in the direction in which a smallest jump amount from the pixel of interest exists. When such a change is caused by the isolated point interpolating process results in such a change, it is determined that the interpolation process can cause a problem. Then, the median of the pixel values of the pixel of interest and the pixels located in the direction of the smallest jump amount is output as in interpolation value. As a result, even when an edge exists in regions of filters, interpolation can be carried out to substitute an interpolation value calculated using the pixel values of pixels having high correlation with the pixel of interest for the pixel level Y11 of the pixel of interest detected as an isolated point. That is, an interpolation process can be properly carried out at an isolated point even in an edge region.

In the above-described embodiment, in an environment having such a poor signal-to-noise ratio that the direction of an edge cannot be determined, it is determined that an isolated point interpolating process can result in a problem. Then, an interpolation value is output such that the problem can be eliminated. Therefore, interpolation can be accurately carried out for an isolated point even in the case of an image signal having a poor signal-to-noise ratio.

In such a case, interpolation is carried out for pixel level Y11 of a pixel of interest using the median of the pixel values of the pixel of interest and pixels located in the direction in which a smallest amount of jump takes place. As a result, even in the case of an image including a character or line having a width equivalent to one pixel, no gap will be formed in the same as a result of an interpolation process.

In the above-described embodiment, since an interpolation value is calculated using median filters, the frequency of the interpolation value will not become unnecessarily low.

In the above-described embodiment, when it is determined that an isolated point interpolating process will result in a problem, an interpolation value is calculated using not only the pixel level of the pixel which has the smallest difference from the pixel level Y11 of the pixel of interest but also the pixel level of the pixel having the second smallest difference from the pixel level Y11. This approach allows an isolated point to be more effectively eliminated than calculating an interpolation value using only the pixel level of the pixel having the smallest difference from the pixel level Y11 of the pixel of interest.

In the above embodiment, a problem eliminating process is carried out as described above when a problem can otherwise occur. Therefore, interpolation can be carried out using ordinary interpolation means such as median filters which can result in problems with a high probability although it is capable of achieving a relatively high level of noise suppression.

In the above-described embodiment, since an isolated point interpolating process is carried out using a 3×3 filter, the number of line memories can be minimized, and resources of an image processing apparatus required for such a process can be saved.

[Modification of the Embodiment]

The above embodiment has been described as an example in which an isolated point interpolating portion 422 is formed by four median filters 422h, 422v, 422ru, and 422rd associated with an H-axis, a V-axis, an RU-axis, and an RD-axis, respectively, and an average value calculating part 422a. However, the invention is not limited to such a configuration. For example, the invention may be used in a configuration employing two median filters associated with an H-axis and a V-axis or a configuration employing a median filter to be applied to all pixels in a filter window as seen in the related art.

Although the above embodiment is an example of an application of an image processing apparatus according to the invention to a three-CCD imaging apparatus, the invention is not limited to such an application. For example, the invention may alternatively be applied to four-CCD imaging apparatus or one-CCD imaging apparatus. When the invention is applied to a one-CCD imaging apparatus, an isolated point among green pixels arranged in a checkerboard pattern on a color filter array can be properly eliminated by performing an isolated point elimination process according to the embodiment.

Figure 6:
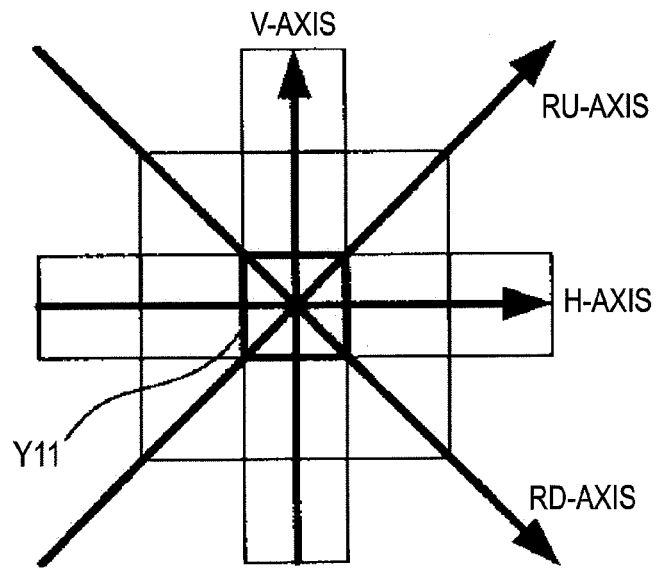
FIG. 6 is an illustration showing an exemplary configuration of median filters according to a modification of the embodiment of the invention.
Figure 7A:
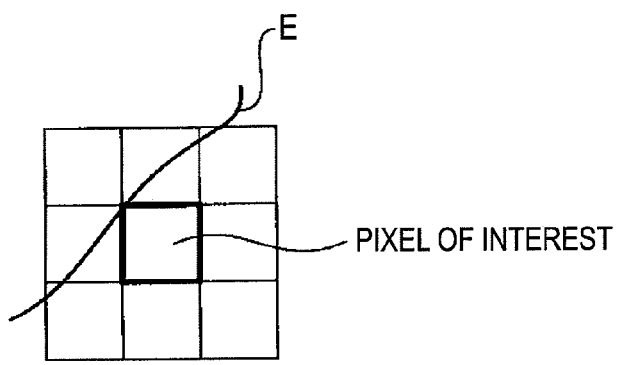

In this case, it is desirable to dispose the isolated point interpolating portion 422 of the embodiment downstream of a circuit for performing a demosaic process. An interpolation process can be adequately performed by providing the median filters with, for example, three taps on the RU- and RD-axes and five taps on the H- and V-axes as shown in FIG. 6.

When the isolated point elimination is to be performed also for red and blue pixels, edge information may be extracted using green pixels neighboring a red or blue pixel that is a pixel of interest, and the isolated point elimination process may be performed only when it is determined there is no edge in the neighborhood.

The present embodiment may be applied to an image processing apparatus in which smoothing is performed using an ϵ filter. An ϵ filter is characterized in that it suffers from an extreme reduction in smoothness because of a reduction in the percentage of pixels that can be added when a pixel of interest is an isolated point. Under the circumstance, the isolated point elimination process according to the embodiment may be performed prior to a smoothing process by the ϵ filter to eliminate an isolated point efficiently without any reduction in smoothness.

The present application contains subject matter related to that disclosed in Japanese Priority Patent Application JP 2009-128099 filed in the Japan Patent Office on May 27, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
   a first interpolating portion calculating a first interpolation value for a pixel value of a pixel of interest using pixel values of the pixel of interest and a plurality of pixels neighboring the pixel of interest;
   a second interpolating portion detecting the direction of a smallest jump amount among directions defined by the pixel of interest and the plurality of neighboring pixels to calculate a second interpolation value for the pixel value of the pixel of interest using the pixel values of pixels located in the direction of a smallest jump amount and the pixel value of the pixel of interest, the direction of a smallest jump amount being a direction in which a smallest sum of differences from the pixel values of the pixel of interest exists;

a detecting portion determining, using the pixel values of the pixels located in the direction of the smallest jump amount, the first interpolation value and the second interpolation value, whether any change is made by interpolation performed using the first interpolation value in the relationship between the magnitudes of the pixel values of the pixel of interest and the pixels located in the direction of the smallest jump amount, selecting the first interpolation value when there is no change, and selecting the second interpolation value when there is a change; and an isolated point detecting portion determining whether the pixel of interest is an isolated point, outputting the first interpolation value or the second interpolation value selected by the detecting portion when it is determined that the pixel of interest is an isolated point, and outputting the pixel value of the pixel of interest when it is determined that the pixel of interest is not an isolated point.

2. An image processing apparatus according to claim 1, wherein the pixel value of each of pixels in a window centered at the pixel of interest and having a range of three pixels in the horizontal direction×three pixels in the vertical direction is input to the second interpolating portion.

3. An image processing apparatus according to claim 2, wherein the pixels located in the direction of a smallest jump amount are a first pixel whose pixel value has a smallest absolute difference from the pixel value of the pixel of interest and a second pixel whose pixel value has a second smallest absolute difference from the pixel value of the pixel of interest.

4. An image processing apparatus according to claim 3, wherein the detecting portion determines that interpolation using the first interpolation value results in a change in the relationship between the magnitudes of pixel values of the pixel of interest and the pixels located in the direction of a smallest jump amount, when the pixel value of the pixel of interest is classified to reside in a high value area before the interpolation and classified to reside in a low value area after the interpolation;

when the pixel value of the pixel of interest is classified to reside in the low value area before the interpolation and classified to reside in the high value area after the interpolation; or when the pixel value of the pixel of interest is classified to reside in a monotonous increase area before the interpolation and classified to reside in the high value area or the low value area after the interpolation, the high value area being an area of pixel values classified to be greater than the pixel value of the first pixel or the second pixel whichever is greater, the low value area being an area of pixel values classified to be smaller than the pixel value of the first pixel or the second pixel whichever is smaller, the monotonous increase area being an area of pixel values classified to be equal to or greater than the pixel value of the first pixel or the second pixel whichever is smaller and classified to be equal to or smaller than the pixel value of the first pixel or the second pixel whichever is greater.

5. An image processing apparatus according to claim 4, wherein the first interpolating portion and the second interpolating portion calculate the first interpolation value and the second interpolation value, respectively, using a median filter.

6. An imaging apparatus comprising:
an imaging portion generating an mage signal by performing photo-electric conversion of object light;

a first interpolating portion calculating a first interpolation value using a pixel value of a particular pixel of interest in the image signal obtained by the imaging portion and pixel values of a plurality of pixels neighboring the pixel of interest;

a second interpolating portion detecting the direction of a smallest jump amount among directions defined by the pixel of interest and the plurality of neighboring pixels to calculate a second interpolation value for the pixel value of the pixel of interest using the pixel values of pixels located in the direction of a smallest jump amount and the pixel value of the pixel of interest, the direction of a smallest jump amount being a direction in which a smallest sum of differences from the pixel values of the pixel of interest exists;

a detecting portion determining, using the pixel values of the pixels located in the direction of the smallest jump amount, the first interpolation value and the second interpolation value, whether any change is made by interpolation performed using the first interpolation value in the relationship between the magnitudes of the pixel values of the pixel of interest and the pixels located in the direction of the smallest jump amount, selecting the first interpolation value when there is no change, and selecting the second interpolation value when there is a change; and an isolated point detecting portion determining whether the pixel of interest is an isolated point, outputting the first interpolation value or the second interpolation value selected by the detecting portion when it is determined that the pixel of interest is an isolated point, and outputting the pixel value of the pixel of interest when it is determined that the pixel of interest is not an isolated point.

7. An image processing method, using an image processing apparatus, comprising the steps of:

calculating a first interpolation value for a pixel value of a pixel of interest using pixel values of the pixel of interest and a plurality of pixels neighboring the pixel of interest;

detecting the direction of a smallest jump amount among directions defined by the pixel of interest and the plurality of neighboring pixels to calculate a second interpolation value for the pixel value of the pixel of interest using the pixel values of pixels located in the direction of a smallest jump amount and the pixel value of the pixel of interest, the direction of a smallest jump amount being a direction in which a smallest sum of differences from the pixel values of the pixel of interest exists;

determining, using the pixel values of the pixels located in the direction of the smallest jump amount, the first interpolation value and the second interpolation value, whether any change is made by interpolation performed using the first interpolation value in the relationship between the magnitudes of the pixel values of the pixel of interest and the pixels located in the direction of the smallest jump amount, selecting the first interpolation value when there is no change, and selecting the second interpolation value when there is a change; and determining whether the pixel of interest is an isolated point, outputting the first interpolation value or the second interpolation value selected by the detecting portion when it is determined that the pixel of interest is an isolated point, and outputting the pixel value of the pixel of interest when it is determined that the pixel of interest is not an isolated point.

* * * * *